United States Patent [19]

Suda et al.

[11] Patent Number: 5,130,740
[45] Date of Patent: Jul. 14, 1992

[54] CAMERA

[75] Inventors: Yasuo Suda; Shoji Kaihara; Shousuke Haraguchi, all of Kanagawa, Japan

[73] Assignee: Canon Kabushiki Kaisha, Tokyo, Japan

[21] Appl. No.: 650,946

[22] Filed: Feb. 5, 1991

[30] Foreign Application Priority Data

Feb. 9, 1990 [JP] Japan .................................. 2-030028

[51] Int. Cl.⁵ .......................................... G03B 7/099
[52] U.S. Cl. ...................................... 354/479; 354/152
[58] Field of Search .......................... 354/479, 152–158

[56] References Cited

U.S. PATENT DOCUMENTS

| | | | |
|---|---|---|---|
| 4,320,945 | 3/1982 | Kimura | 354/152 |
| 4,331,402 | 5/1982 | Nihei | 354/152 |
| 4,673,278 | 6/1987 | Fukuda et al. | 354/152 |

Primary Examiner—L. T. Hix
Assistant Examiner—David M. Gray
Attorney, Agent, or Firm—Fitzpatrick, Cella, Harper & Scinto

[57] ABSTRACT

A camera comprises a main mirror which is arranged to guide the light of an object to be photographed to a viewfinder optical system and to be movable to and from its finder-viewing position and its exposure position; a sub-mirror which is arranged to guide the object light to a focus detecting device and to be movable to and from its focus detecting position and its exposure position; a spring member which is arranged to urge the sub-mirror; and a change-over mechanism which is arranged to change the urging direction of the spring member according to the moving position of the the main mirror and also to restrict the position of the sub-mirror when the sub-mirror is in the focus detecting position.

14 Claims, 6 Drawing Sheets

CAMERA

BACKGROUND OF THE INVENTION

1. Field of the Invention

This invention relates to a camera of the kind having a movable mirror.

2. Description of the Related Art

The movable mirror arrangement of the recent single-lens reflex cameras generally includes a main mirror and a sub-mirror for automatic focusing. The main mirror is arranged to reflect the light of a photographed object toward a viewfinder optical system. The sub-mirror is arranged to reflect a part of the object light toward a focus detecting device after it has passed through the main mirror.

Many of the movable mirrors recently proposed are arranged to have the sub-mirror movable relative to the movable main mirror. The sub-mirror is urged by a spring to open to permit focus detection when the main mirror is moved down to its finder-viewing position. The sub-mirror is closed to its exposure position when the main mirror is moved up to its exposure position.

A camera using a toggle spring as the spring for urging the sub-mirror was proposed by U.S. Pat. No. 4,320,945. However, the conventional sub-mirror urging device using the toggle spring has imposed many restrictions on design work as it necessitates: The provision of a stopper near an area where an object light flux passes in taking a shot for the purpose of restricting the degree of opening angle of the sub-mirror in its focus detecting position, i.e., in its state of being opened relative to the main mirror; and some arrangement to prevent the light flux from being eclipsed through a space where the stopper is located. The conventional device also has necessitated some arrangement against the adverse effect of inner surface reflection resulting from the provision of the stopper.

SUMMARY OF THE INVENTION

One aspect of this invention is the provision of a camera of the kind having a toggle spring mechanism for turning a sub-mirror relative to a main mirror, wherein the above-stated problems with respect to the eclipse of the light flux and the inner surface reflection can be solved by imparting a sub-mirror opening angle restricting function to a mechanism which is arranged to invert the spring urging force of the toggle spring mechanism.

The above and other aspects and features of the invention will become apparent from the following detailed description of an embodiment thereof taken in conjunction with the accompanying drawings.

BRIEF DESCRIPTION OF THE DRAWINGS

FIG. 1 is a side view of a mirror.

FIGS. 2 and 3 are left and right side views showing the mirror in a state of being set in position within a mirror box.

FIG. 4 is a side view showing the mirror in a state of being moved up.

FIG. 5 is an enlarged view of a rotation fulcrum located within the mirror box.

DETAILED DESCRIPTION OF THE PREFERRED EMBODIMENT

Figure 1:
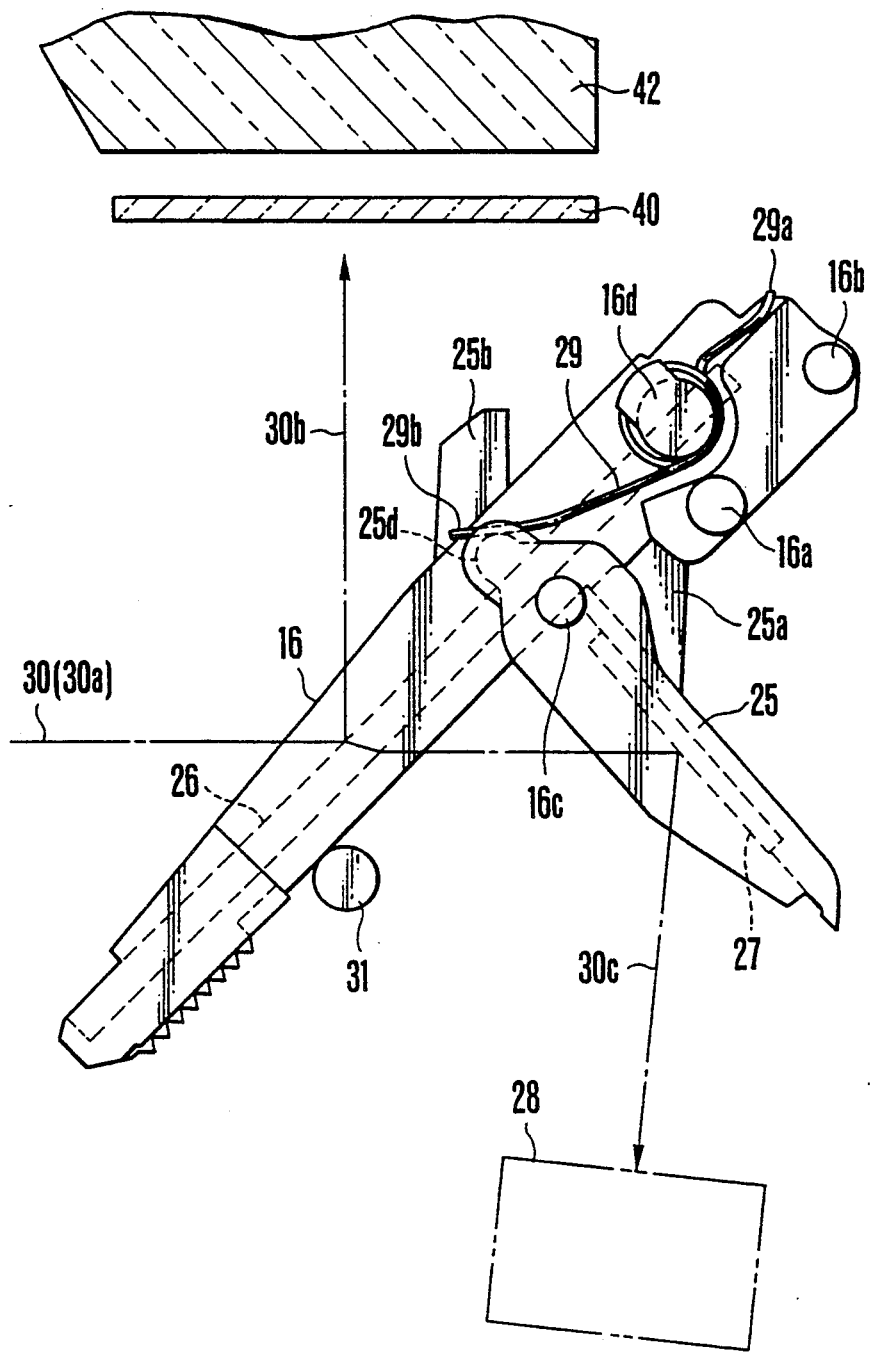
FIGS. 1 to 5 show a camera arranged according to this invention.

FIG. 1 is a side view showing a movable mirror in a state of being moved down (mirror-down state). A main mirror holding member 16 is, for example, molded with a plastic material and is arranged to carry a main mirror 26 which is a half-transparent mirror. Support shafts 16b are formed at the two ends of one side of the main mirror holding member 16 in one body with the member 16.

As shown in FIGS. 2 to 5, the main mirror holding member 16 is placed within a mirror box 120 which is molded in one body with a plastic material. The support shafts 16b are fitted into U-shaped grooves 120b and 120d formed in the rear ends of the two side walls of the mirror box 120. The main mirror holding member 16 is carried in such a way as to be turnable with the support shafts 16b serving as fulcrums. The counterclockwise turn of the main mirror holding member 16 is restricted by abutting on a stopper 31 which is provided on the inner side of the side wall and the main mirror holding member 16 is thus kept in the mirror-down position by means of the stopper 31.

The mirror holding member is arranged to be driven and moved between the mirror-down position, i.e., the finder-viewing position, and a mirror-up position, i.e., an exposure position. In moving the mirror holding member 16 up to the mirror-up position, the spring force of a mirror-up spring 14 is used. In moving the mirror holding member 16 down to the mirror-down position, a cam 8 which is arranged to be rotated by a motor 1 is used in conjunction with levers 11 and 12, as will be described further later herein. These driving forces are exerted through a driving pin 16a which is provided on the mirror holding member 16.

A sub-mirror 27 which is provided for distance measurement is secured to a sub-mirror holding member 25 and is swingably carried by a shaft 16c which is formed in one unified body with the main mirror holding member 16. A spring 29 is carried by a spring peg part 16d and has one end 29a of it abutting on the mirror holding member 16 and the other end 29b abutting on an acting part 25d of the sub-mirror holding member 25. The spring 29 thus forms a toggle spring inversion mechanism for producing a spring force to urge the sub-mirror holding member 25 to turn counterclockwise in the mirror-down position and to turn clockwise in the mirror-up position. The toggle spring inverting action requires a cam member, which will be described later with reference to FIGS. 2, 3 and 4.

A reference numeral 30 denotes the optical axis of a central light flux coming into the camera body via a photo-taking lens which is not shown. An optical axis 30a is obtained through the photo-taking lens. An optical axis 30b is reflected by the surface of the main mirror 26 to be guided to a focusing screen 40 and a pentagonal prism 42 which are arranged as a viewfinder optical system. An optical axis 30c passes through the main mirror 26 and is totally reflected by the sub-mirror 27 to be guided to a distance measuring unit 28. The distance measuring unit 28 is arranged in any of well known manners. Therefore, the details of it is omitted from description herein.

Figure 2:
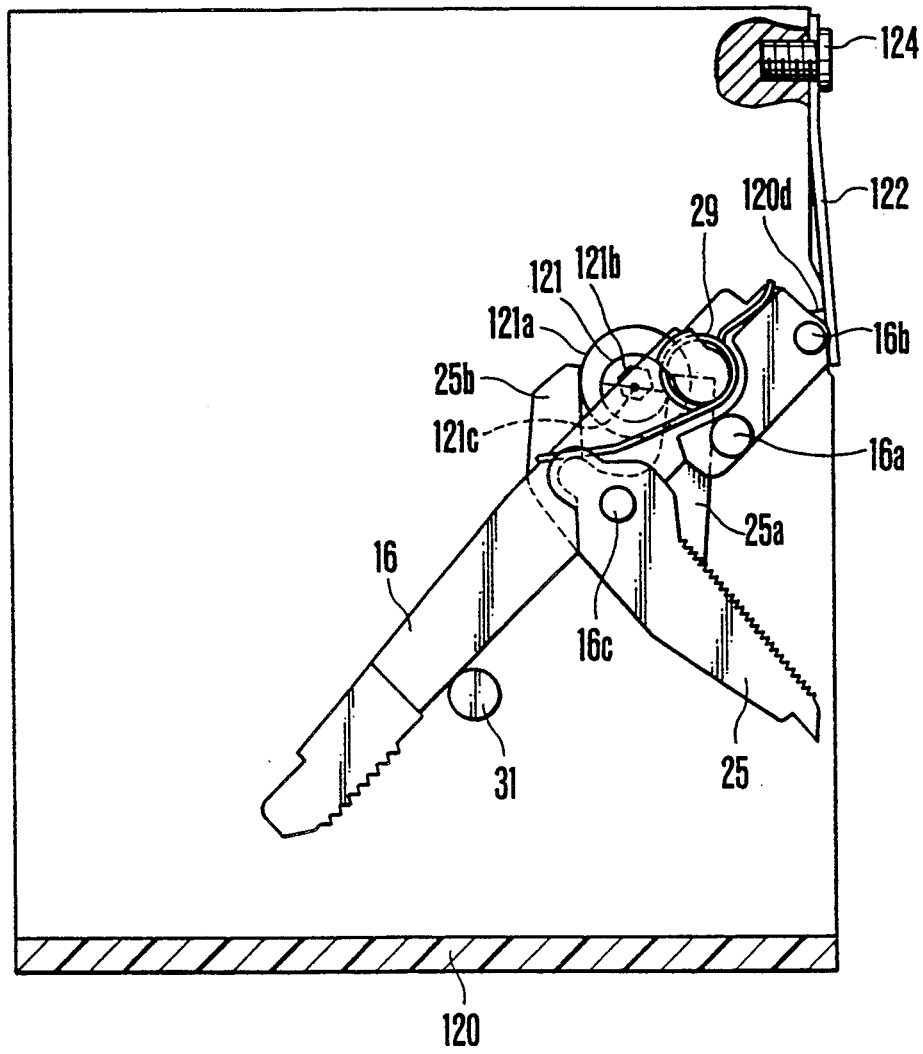
Figure 3:
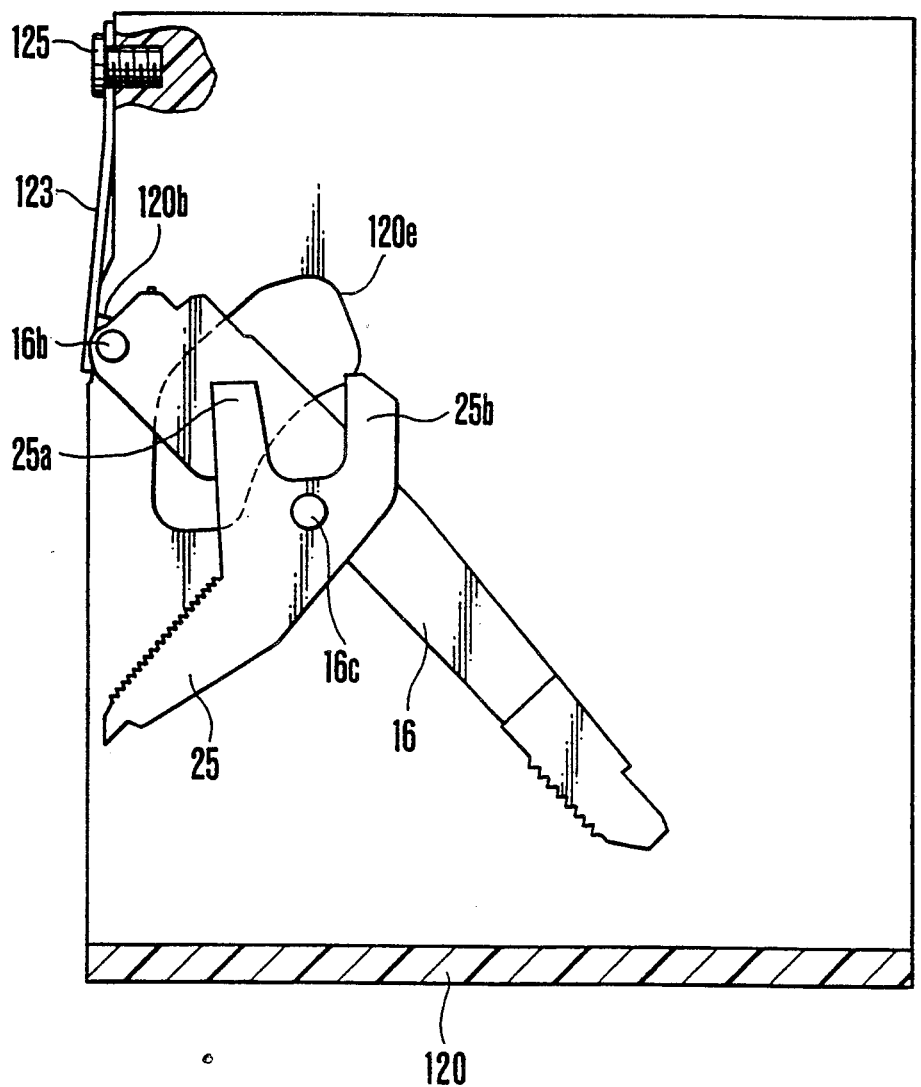
Figure 5:
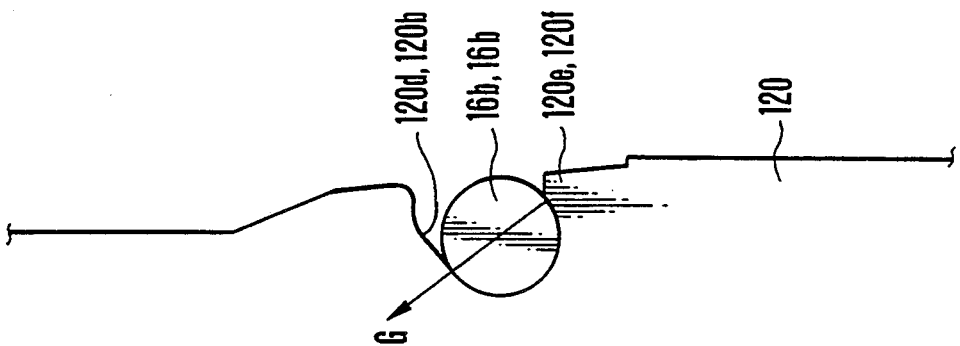
Figure 4:
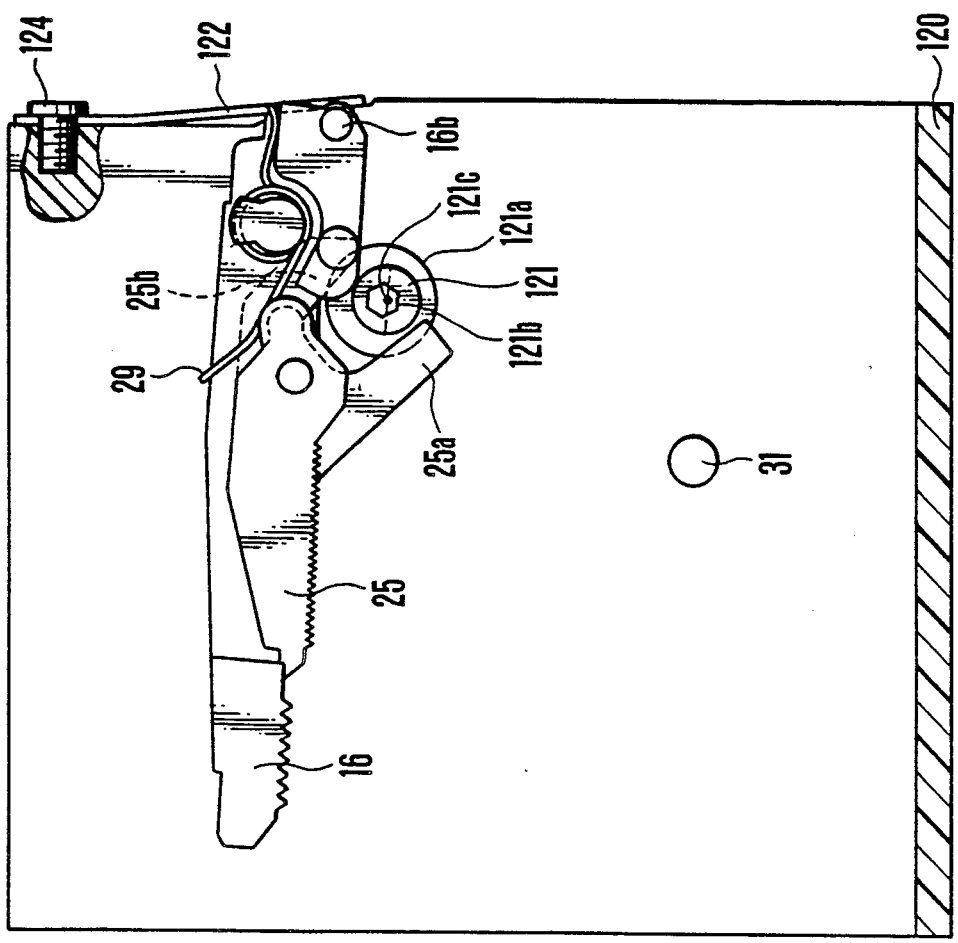

FIGS. 2 to 5 show only the essential parts of the mirror mechanism of FIG. 1 in a stat of being assembled within the mirror box 120. FIGS. 2 and 3 are left and right side views. FIG. 4 is a side view showing the mechanism in an operating state. FIG. 5 is an enlarged view showing the turning fulcrum of the main mirror. Referring to these drawings, an eccentric pin 121 is arranged on one side of the mirror box 120 to permit adjustment of eccentricity. With the eccentric pin 121 abutting on a first arm part 25a of the sub-mirror holding member 25, the opening angle of the main mirror 26 in its finder-viewing position is determined. In moving the main mirror 26 up to the exposure position, a second arm part 25b of the sub-mirror holding member 25 abuts on the eccentric pin 121. The above-stated toggle spring inversion mechanism is formed by this.

The eccentric pin 121 is provided with a flange 121a and is carried by the inner wall of the mirror box 120 in such a way as to be steadily turnable on a caulked leg part which is not shown. A hexagonal hole 121b is a through-hole formed coaxially with the center of rotation of the pin 121. A reference numeral 121c denotes the center of the eccentric pin 121. As apparent from these drawings, the center of the pin 121 deviates from the center of rotation. The angle of the sub-mirror in the finder-viewing position is adjustable by inserting an adjusting tool into the hexagonal hole 121b and by turning the eccentric pin 121.

Retaining plates 122 and 123 which are thin metal plates are arranged to hold the shafts 16b of the main mirror holding member 16 at the two side walls of the mirror box 120. These retaining plates 122 and 123 are attached to the rear end faces of the two side walls of the mirror box 120 by means of screws 124 and 125 respectively. As shown in FIG. 5, U-shaped grooves 120d and 120b are formed in the two side walls of the mirror box 120. The shafts 16b of the main mirror holding part 16 are rotatably fit into the U-shaped grooves 120d and 120b. The retaining plates 122 and 123 cover the open parts of these grooves and exert resilient retaining forces on the shafts 16b in such a way as to prevent them from deflecting when the mirror is moved up. Since the retaining plates 122 and 123 are made of a thin metal material or the like, they can be arranged at the end part of the mirror box 120 close to a focal plane shutter. This arrangement gives an optimum swinging fulcrum to the main mirror holding member 16.

Figure 6:
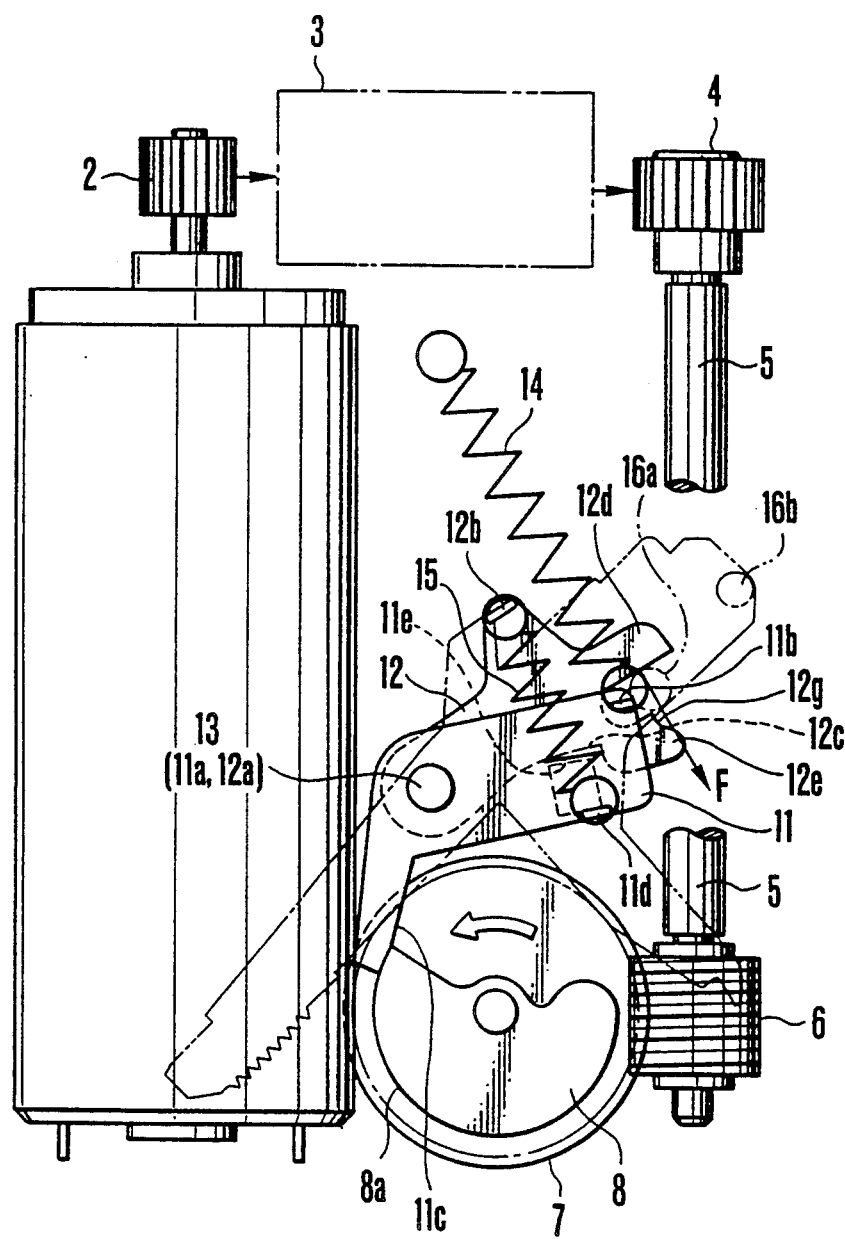
FIG. 6 shows a mirror driving mechanism.

Next, a mirror driving mechanism is described as follows: FIG. 6 is a sectional view showing the mirror driving mechanism. The illustration includes a motor 1; a gear 2 which is secured to the output shaft of the motor 1; and a transmission mechanism 3 which is arranged to transmit the output of the gear 2 to a gear 4. The transmission mechanism 3 consists of a reduction gear train and can be easily formed by a combination of double gears. The detailed description of the mechanism 3 is, therefore, omitted. The gear 4 is secured to one end of a transmission shaft 5. A worm gear 6 is secured to the other end of the transmission shaft 5. A helical gear 7 is arranged to be rotated only counterclockwise as indicated by an arrow by the rotation of the motor 1 in a given direction. A mirror driving cam 8 is secured to the helical gear 7. A support shaft 13 is formed in one body with one side wall of the mirror box 120 and is arranged to have the shaft part 12a of a lever 12 which is located on a lower side and the shaft part 11a of a lever 11 which is located on an upper side swingably fitted thereon respectively. The upper lever 11 is urged to turn counterclockwise by a mirror-up spring 14 at its spring peg part 11b. A cam abutting part 11c in the working lever part of the lever 11 abuts on the maximum lift part 8a of the mirror driving cam 8 and is held there by turning clockwise against the urging force of the mirror-up spring 14. The maximum lift part 8a of the mirror driving cam 8 is formed in a predetermined round shape. To the spring peg part 11d of the lever 11 is attached one end of a pulling spring 15. The other end of the pulling spring 15 is attached to the spring peg part 12b of the lever 12. The pulling spring 15 is arranged to cause the levers 11 and 12 to pull each other in the counterclockwise and clockwise directions, respectively. The urging force of this spring 15 causes the abutting parts 11e and 12c of the levers 11 and 12 to abut on each other to prevent them from turning in the directions of confronting each other. The abutting part 11e of the lever 11 is protruding toward the lever 12 and is located in a position to abut on the abutting part 12c of the lever 12. The lever 12 has a U-shaped groove formed in one arm part 12d at one end part thereof. The arm part 12d is inserted into the mirror box 120 through the through-hole 120e and abuts on the driving pin 16a of the main mirror 16. The main mirror 16 is turnable on the support shaft 16b and, in its state as shown in FIG. 6, is pushed counterclockwise to be kept in the mirror-down position. Under this condition, the lever 12 is prevented from making a clockwise turn. Meanwhile, the lever 11 is allowed to further turn against the force of the pulling spring 15 into an overcharge state. As a result, the abutting parts 11e and 12c of the levers 11 and 12 are not abutting on each other.

The operation of the mirror driving mechanism is described as follows: When the mirror driving cam 8 rotates further from its position of FIG. 6 in association with the rotation of the motor 1, the cam abutting part 11c of the lever 11 is released from its state of abutting the maximum lift part 8a of the mirror driving cam 8. Then, the mirror-up spring 14 causes the lever 11 to turn counterclockwise. At this moment, the abutting parts 11e and 12c of the levers 11 and 12 are in a state of being caused to abut on each other by the force of the pulling spring 15. The action of the cam 8 on the cam abutting part 11c then causes the lever 12 to turn also counterclockwise. The fore end of the other arm part 12e of the lever 12 has a cam part 12g. This cam part 12g comes to abut on the driving pin 16a of the main mirror holding member 16. This causes the main mirror holding member 16 to turn clockwise to be moved up it to the finder-viewing position.

With the main mirror holding member 16 caused to turn on the support shafts 16b, the sub-mirror holding member 25 begins to be moved up in a state of having its arm part 25a abutting on the eccentric pin 121. Following this, when the sub-mirror 27 is turned about 25 degrees in the closing direction, the toggle spring inversion mechanism is operated by the spring 29. After that, the sub-mirror holding member 25 is placed under an urging spring force which is exerted in the direction of closing. With the main mirror 26 having been completely moved up to the mirror-up position, both the two arm parts 25a and 25b of the sub-mirror holding member 25 are away from the eccentric pin 121. The sub-mirror holding member 25 is then in a state of being in close contact with the main mirror holding member 16.

When the mirror driving cam 8 rotates further counterclockwise, the cam abutting part 11c of the lever 11 again rides on the maximum lift part 8a of the mirror driving cam 8. The arm part 12d of the lever 12 then pushes down the driving pin 16a to perform a mirror-down action. During the process of the mirror-down action, the arm part 25b of the sub-mirror holding member 25 comes to abut on the eccentric pin 121. This again actuates the toggle spring inversion mechanism. Then, the mirror-down action comes to an end with the sub-mirror holding member 25 in a state of being urged by the spring 29 to move in the opening direction and with the arm part 25a in contact with the eccentric pin 121.

During the above-stated series of actions, the positional precision of the mirror mechanism is most strictly required in the mirror-down state. Under this condition, the lever 11 is in an overcharge state as mentioned above. The pulling spring 15 is exerting its urging force on the driving pin 16a in the direction of arrow F as shown in FIG. 6. A reaction against this force develops in the U-shaped grooves 120b and 120d of the mirror box 120. In the U-shaped grooves 120b and 120d of the mirror box 120, the reaction force is exerted in the direction of arrow G as shown in FIG. 5. To generate the force in the direction of arrow G in the mirror box 120, the U-shaped grooves 120b and 120d are formed into an obliquely downward extending U shape to have projections 120e and 120f shaped as shown in FIG. 5. The projections 120e and 120f are arranged to embrace the fitting engagement parts of the support shafts 16b. This enhances the stability of the mirror mechanism in its finder-viewing position. Compared with a mechanism having no such projection, the stability is greatly increased, because the mirror box 120 can be considered as in a rigid state while the retaining plates 122 and 123 are resilient.

Figure 7:
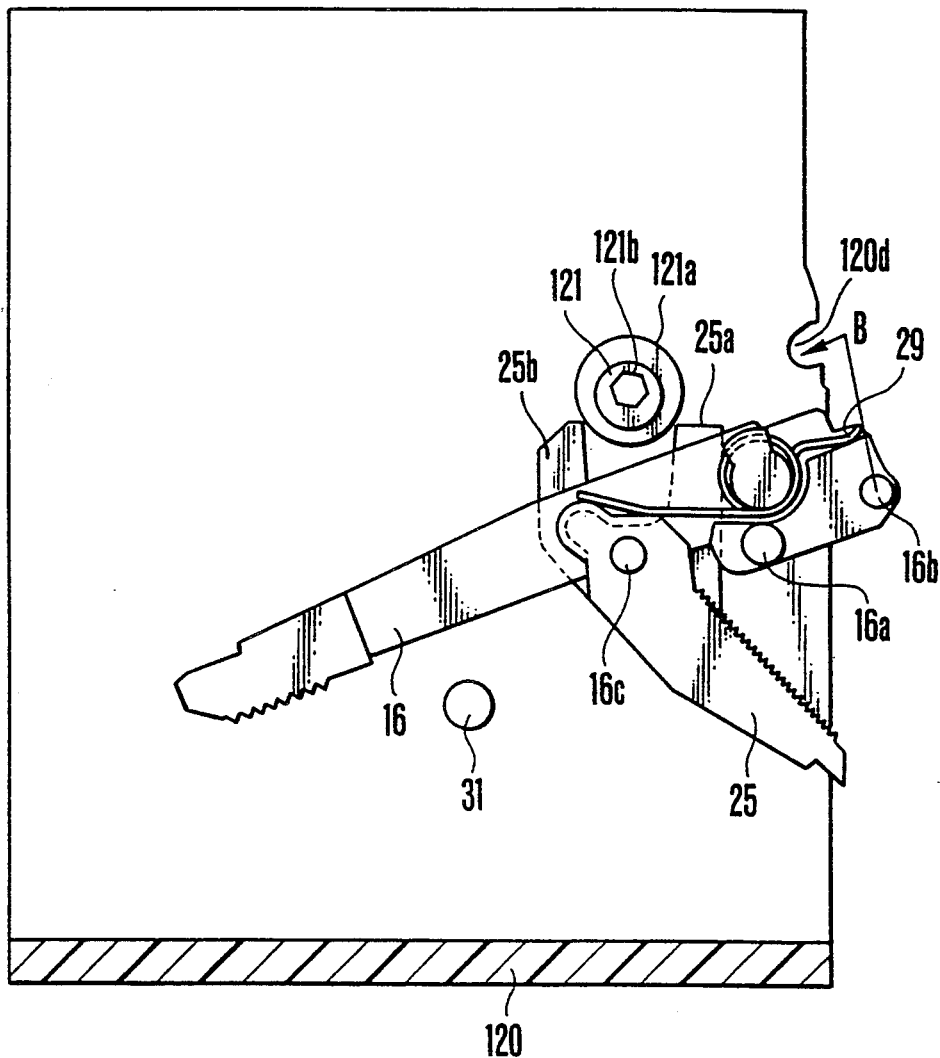
FIG. 7 shows a mirror unit in the process of being assembled.

FIG. 7 shows the process of assembly work on the mirror mechanism described in the foregoing. A mirror unit which is composed of the main mirror 26, the main mirror holding member 16, the sub-mirror 27, the sub-mirror holding member 25 and the spring 29 is placed within a mirror box unit which is composed of the mirror box 120, the eccentric pin 121 and the stopper 31.

The members which are protruding into the inside of the mirror box 120 in this assembled state include the stopper 31 and the eccentric pin 121 which serve both as a toggle spring inversion mechanism and a sub-mirror position restricting member. The eccentric pin 121 is interposed in between the two arm parts 25a and 25b of the sub-mirror holding member 25. The stopper 31 is arranged to receive the main mirror holding member 16 which comes from above. Therefore, the assembly work begins with insertion of the main mirror holding member 16 in between the eccentric pin 121 and the stopper 31. At that time, the sub-mirror holding member 25 may be allowed either to be in a state of being opened by the action of the spring 29 or to be in a closed state. However, in this case, the sub-mirror holding member 25 is set in the open state. As a result, the two arm parts 25a and 25b of the sub-mirror holding member 25 are facing the eccentric pin 121 which is disposed above them. Next, the support shafts 16b are moved in the direction of arrow B to put them into the U-shaped grooves 120b and 120d of the mirror box 120. At the same time, the two arm parts 25a and 25b of the sub-mirror holding member 25 come to have the eccentric pin 121 between them. As a result, there obtains a state as shown in FIGS. 2 and 3. In the last place, the retaining plates 122 and 123 are fixed by means of the screws 124 and 125 to end the assembly work on the mirror unit. As mentioned above, the eccentric pin 121 is arranged to serve as the toggle spring inversion mechanism as well as the sub-mirror opening angle restricting member; the mirror box 120 has two protruding members within there including the eccentric pin 121 and the stopper 31; and the sub-mirror holding member 25 is urged by the spring 29 in the direction of opening it. This arrangement greatly facilitates the assembly work on the mirror unit. Further, the use of the toggle spring inversion mechanism obviates the necessity of restricting the position of the sub-mirror holding member 25 in its sub-mirror closing state. It also precludes the possibility of an excessively large closing force on the sub-mirror holding member 25 even when the member is somewhat excessively turned from a given position by the force of inertia in the last stage of the mirror-up action.

In the embodiment, as described in the foregoing, the pin which is employed as a toggle spring inversion mechanism for change-over of the sub-mirror swinging direction (opening or closing direction) relative to the main mirror is arranged to serve as a member for restricting the position of the sub-mirror in its open state (in a focus detecting position). This permits reduction in the number of necessary parts. Further, this obviates the necessity of having a stopper pin provided for the sub-mirror within the mirror box at a part where the light flux of the photographed object passes through. That eliminates the possibility of any adverse effect of the inner surface reflection that might otherwise be caused by the stopper pin. Further, it also prevents the light flux from being eclipsed. Therefore, the arrangement of the embodiment allows a greater design latitude than the conventional arrangement. While the sub-mirror is provided for focus detection, it may be changed to be used for light measurement instead of focus detection.

What is claimed is:

1. A camera comprising:
   a) a main mirror member arranged to guide object light to a viewfinder optical system and to be movable between its finder-viewing position and its exposure position;
   b) a sub-mirror member arranged to guide the object light to a focus detecting device and to be movably supported by said main mirror member and movable between its focus detecting position and its exposure position;
   c) a spring member arranged to urge said sub-mirror member; and
   d) a mechanism for changing a moving position of said sub-mirror member in response to a moving position of said main mirror member, said mechanism including a fixed member which contacts said sub-mirror member to move the same to said focus detecting position during the movement of said main-mirror member from said exposure position to said finder-viewing position, said fixed member functioning as a stopper when said sub-mirror member moves to said focus detecting position.

2. A camera according to claim 1, wherein said spring member is mounted on said main mirror.

3. A camera according to claim 1, wherein said mechanism includes said fixed member and a contacting part formed in said sub-mirror member and arranged to engage with said fixed member, whereby said sub-mirror member moves by change in a relative position of said fixed member relative to said sub-mirror member in response to a swinging movement of said main-mirror member, and when said sub-mirror member moves to said focus detecting position, said contacting part contacts said fixed member by urging force of said spring member and said sub-mirror is restricted to said focus detecting position.

4. A camera according to claim 3, wherein said spring member is arranged to urge said sub-mirror member in an opening direction when said main mirror member is in said finder-viewing position.

5. A camera according to claim 1, wherein said main mirror member is swingably carried within a mirror box.

6. A camera comprising:
a) a main mirror member arranged to guide object light to a viewfinder optical system and to be movable between its finder-viewing position and its exposure position;
b) a sub-mirror member arranged to be swingably supported by said main mirror member;
c) a spring member arranged to urge said sub-mirror in an opening direction to said main mirror member; and
d) a mechanism which changes a moving position of said sub-mirror member in response to a moving position of said main mirror member, said mechanism including a fixed member which contacts said sub-mirror member to move the same to an open position when said main mirror member moves from said exposure position to said finder-viewing position, said fixed member functioning as a stopper when said sub-mirror member moves to said open position.

7. A camera according to claim 6, wherein said spring member is mounted on said main mirror member.

8. A camera according to claim 6, wherein said mechanism includes said fixed member and a contacting part formed in said sub-mirror member and arranged to engage with said fixed member, whereby said sub-mirror member moves by change in a relative position of said fixed member relative to said sub-mirror member in response to said main mirror member, and when said sub-mirror member moves to said open position, said contacting part contacts said fixed member by urging force of said spring member and said sub-mirror member is restricted to said open position.

9. A camera according to claim 8, wherein said spring member is arranged to urge said sub-mirror member in an opening direction when said main mirror member is in said finder-viewing position and in a closing direction when said main mirror is in said exposure position.

10. A camera comprising:
a) a main mirror member arranged to guide object light to a viewfinder optical system and to be movable between its finder-viewing position and its exposure position;
b) a sub-mirror member arranged to be swingably supported by said main mirror;
c) a spring member arranged to urge said sub-mirror member in an opening direction or in a closing direction relative to said main mirror member; and
d) a pin-like member arranged to change the urging direction of said spring member in accordance with a moving position of said main mirror member, said pin-like member serving also to restrict and adjust the position of said sub-mirror member when said sub-mirror member is in its open position.

11. A camera according to claim 10, wherein said spring member is mounted on said main mirror member.

12. A camera according to claim 10, wherein said pin-like member changes the urging direction of said spring member for said sub-mirror member in response to with a swinging movement of said sub-mirror member associated with the movement of said main mirror member, and restricts the position of said sub-mirror member by causing a contacting part at said sub-mirror member to engage with said pin-like member.

13. A camera according to claim 12, wherein said pin-like member is an eccentric pin, and wherein the position of said sub-mirror member in the open position thereof is adjusted by turning said eccentric pin.

14. A camera according to claim 12, wherein said spring member is arranged to urge said sub-mirror member in an opening direction when said main mirror member is in said finder-viewing position and in a closing direction when said main mirror member is in said exposure position.

* * * * *

UNITED STATES PATENT AND TRADEMARK OFFICE
CERTIFICATE OF CORRECTION

PATENT NO. : 5,130,740
DATED : July 14, 1992
INVENTOR(S) : Suda et al.

It is certified that error appears in the above-identified patent and that said Letters Patent is hereby corrected as shown below:

Title page, item,

[57] ABSTRACT:

Line 11, "the" (second occurrence) should be deleted.

COLUMN 2:

Line 68, "stat" should read --state--.

COLUMN 3:

Line 22, "pin 121" should read --pin 121c--.

Signed and Sealed this

Ninth Day of August, 1994

BRUCE LEHMAN

Attest:

Attesting Officer

Commissioner of Patents and Trademarks